(12) United States Patent
Diresta

(10) Patent No.: US 6,485,348 B2
(45) Date of Patent: Nov. 26, 2002

(54) COMBINATION LOLLIPOP HOLDER AND STAND

(76) Inventor: James Diresta, 1078 W. Broadway, Woodmere, NY (US) 11598

( * ) Notice: Subject to any disclaimer, the term of this patent is extended or adjusted under 35 U.S.C. 154(b) by 0 days.

(21) Appl. No.: 09/775,384

(22) Filed: Feb. 1, 2001

(65) Prior Publication Data

US 2002/0102904 A1 Aug. 1, 2002

(51) Int. Cl.$^7$ ............................................. A63H 33/00
(52) U.S. Cl. ..................... 446/73; 446/386; 446/390; 426/104
(58) Field of Search .................. 446/71, 72, 73, 446/267, 386, 390, 484, 487; 426/104, 134; 600/240

(56) References Cited

U.S. PATENT DOCUMENTS

| | | |
|---|---|---|
| 1,794,311 A | 2/1931 | Mendell |
| D149,370 S | 4/1948 | Mickus |
| 2,506,328 A | 5/1950 | Alger ........................... 46/173 |
| 3,431,041 A | 3/1969 | Fontlladosa ................. 312/284 |
| 3,995,395 A | 12/1976 | Rahmstorf .................... 46/161 |
| 4,499,678 A | 2/1985 | Moreau ......................... 40/1.6 |
| 5,209,692 A * | 5/1993 | Coleman et al. .............. 446/71 |
| D353,251 S | 12/1994 | Beck ........................... D1/105 |
| 5,391,107 A | 2/1995 | Coleman ..................... 446/484 |
| 5,536,054 A | 7/1996 | Liaw ............................ 294/1.1 |
| 5,634,885 A | 6/1997 | Kiro ............................ 600/240 |
| 5,666,693 A * | 9/1997 | Levay ........................... 16/427 |
| 5,681,200 A | 10/1997 | Shecter ......................... 446/76 |
| 5,690,535 A | 11/1997 | Coleman ..................... 446/236 |
| 5,874,119 A * | 2/1999 | Coleman et al. ............. 426/104 |
| 5,919,079 A | 7/1999 | Coleman et al. ............. 446/487 |
| 5,921,841 A | 7/1999 | Coleman et al. ............. 446/267 |
| 5,938,153 A * | 8/1999 | Coleman et al. .............. 446/73 |
| 6,027,752 A * | 2/2000 | Coleman et al. ............. 426/134 |
| D423,183 S | 4/2000 | Diresta ........................ D1/105 |
| 6,054,158 A * | 4/2000 | Hart et al. ................... 426/134 |
| 6,074,266 A * | 6/2000 | Zak .............................. 446/73 |
| 6,090,420 A * | 7/2000 | Coleman et al. ............. 426/104 |

* cited by examiner

*Primary Examiner*—Jacob K. Ackun
(74) *Attorney, Agent, or Firm*—Robert WJ Usher

(57) ABSTRACT

A combination lollipop holder and stand having a unitary body forming a character and an elongate torso providing a handle portion, two arm parts outstanding laterally from an upper end of the torso, providing a finger guarding portion and a leg part diverging from opposite sides of a lower end of the body to a flat, foot part, providing a base portion. A bore extends from a neck region between the arms parts vertically into the torso and is provided with a constriction for gripping an inserted lollipop stick which forms an extended neck and consumable head of the character. Engagement of the arm and leg parts above and below a hand enclosing the torso prevents inadvertent dislodgement of the lollipop from the hand. The foot supports the body in stable position standing on a flat surface with the lollipop remote from the surface.

5 Claims, 2 Drawing Sheets

FIG 1
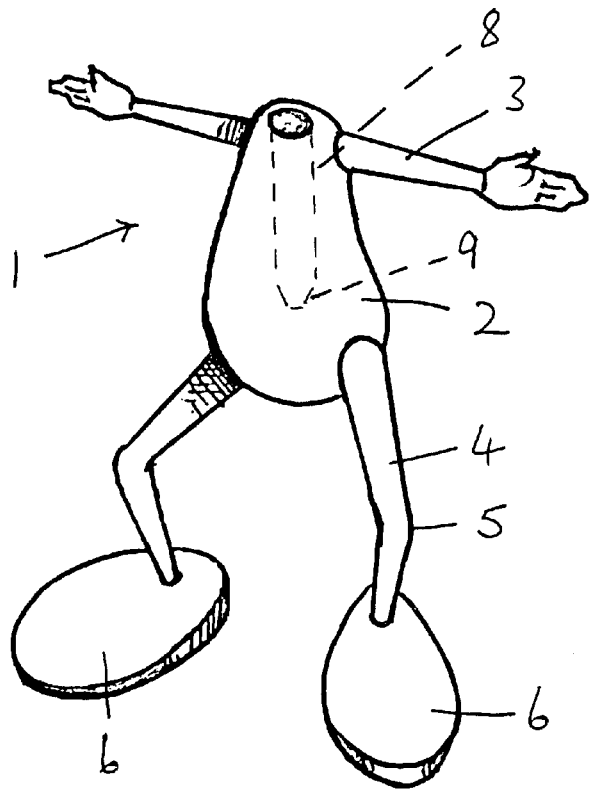
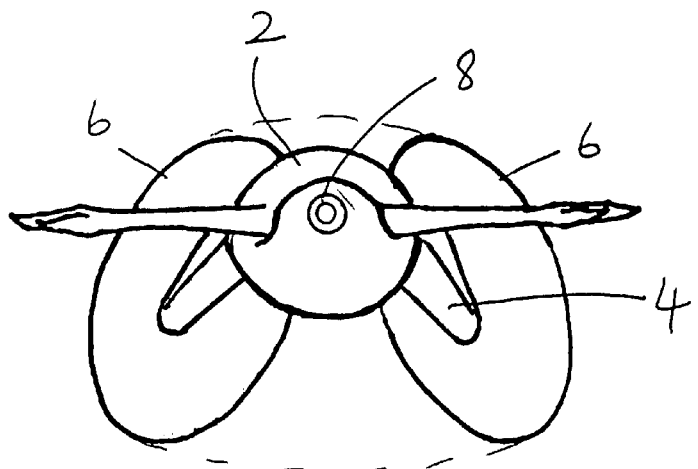

COMBINATION LOLLIPOP HOLDER AND STAND

FIELD OF THE INVENTION

The invention relates to a combination lollipop holder and stand.

BACKGROUND OF THE INVENTION

Lollipops have been consumed for many years. and the disadvantages arising particularly with young children, such as sticky hands producing cross-contamination, slippage from an unreliable grasp and hygienic placement of the lollipop between periods of intermittent consumption are well recognized.

A hand-held lollipop holder which obviates such disadvantages, which is amusing and therefore conducive to use and is of low cost, suited for distribution with the lollipop would clearly be desirable.

One prior lollipop holder is taught by U.S. Pat. No. 5,681,200 issued 1997 to Shecter, teaches a toy telephone which has an integral lollipop handle, holder in which the lollipop is mounted on a slide which retracts the lollipop into an internal compartment between periods of consumption. However, this is a relatively bulky, heavy, complex and expensive, multipart construction, and as such, unsuitable for general distribution with lollipops, or for use by a young child from whose hand it could easily be dropped with expensive consequences.

U.S. Pat. No. Des. 353,251 issued 1994 to Beck teaches a safety candy holder having cylindrical handle with a constricted lollipop receiving bore and a finger guard outstanding from opposite sides at one end. However, the smoothly surfaced cylindrical handle could, when inverted, easily slip from the grasp of a child user, while the structure does not provide an additional source of amusement which would be conducive to regular use. Furthermore, the right cylindrical shape of the handle results in a relatively small base and relatively instability, if freestanding.

Other lollipop holders, taught by U.S. Pat. No. 5,690,535 and 5,536,054, include complex and expensive lollipop spinning mechanisms and are otherwise unsuited for the purpose of the present invention.

SUMMARY OF THE INVENTION

It is an object of the invention to provide a combination lollipop holder and stand which provides a handle with a finger guard, adapted to be held securely in the grasp of a child .

It is an additional object of the invention to provide such combination lollipop holder and stand which is formed by only a single piece of small size, adapted for manufacture at high volume and low cost by conventional mass production techniques.

According to one aspect, the invention provides a combination lollipop holder and stand having a handle-providing body formed in a shape of a headless humanoid character and diverging downward to a foot, with a bore extending into the body from a neck position and force-fitted with a stick of a lollipop for retention when inverted and so that the stick resembles a neck and a lollipop candy thereon resembles a consumable head of the character.

More specifically, the invention provides a combination lollipop holder and stand comprising a unitary body forming an animal character and having an elongate torso providing a handle portion, two arm parts outstanding laterally from an upper end of the torso, providing a finger guarding portion and a leg part diverging from opposite sides of a lower end of the body to a flat, foot part, providing a base portion; and, a bore extending between the arms parts vertically into the torso and provided with constriction for gripping a stick of a lollipop inserted into the bore and thereby forming an extended neck and consumable head of the character. In this structure, engagement of the arm and leg parts above and below a hand enclosing the torso prevents inadvertent dislodgement of the lollipop from the hand and the constriction prevents inadvertent dislodgement of the lollipop from the bore, even when inverted.

Preferably, substantially the entire body lies within a vertical envelope bounded by the perimeter of the foot part and the torso is substantially pear shaped, both improving stability.

BRIEF DESCRIPTION OF THE DRAWINGS

A specific embodiment of the invention will now be described with reference to the accompanying drawings in which:

FIG. 1 is a perspective view from above and one side of the combination lollipop holder and stand;

FIG. 2 is plan view;

DESCRIPTION OF PARTICULAR EMBODIMENT

Figure 3:
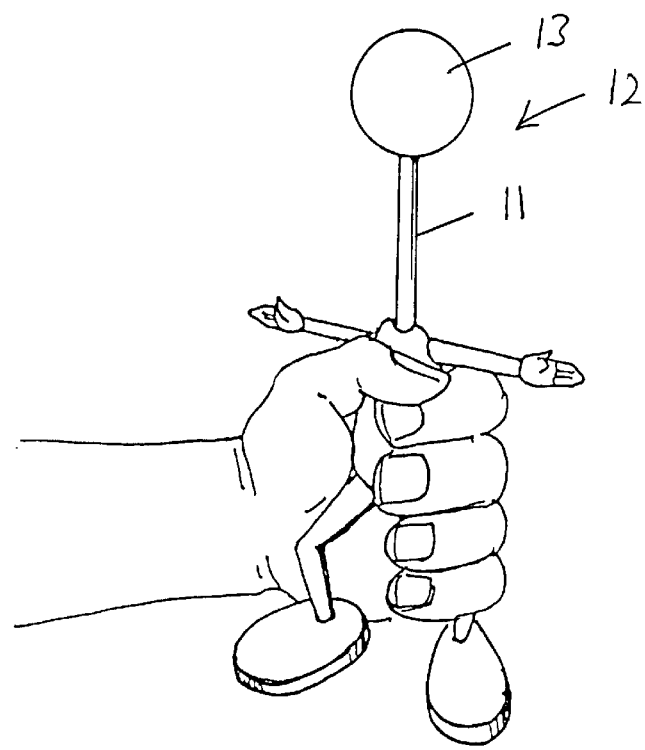
FIG. 3 is a perspective view holding the lollipop and grasped by a child's hand.

The combination lollipop holder and stand comprises an animal character a headless humanoid body 1 molded in one piece with a pear shaped trunk or torso 2, providing a handle portion from which arms 3 extend laterally, providing a hygienic finger guard portion, and legs 4, bent at the knee 5, diverge to flat, feet 6, providing a base portion. A bore 8 extends in a neck region vertically into the trunk 2, tapering at a lower end 9 to provide a wedging constriction for gripping the stick 11 of a lollipop 12, forming an extended neck with the candy 13 forming a head of the character.

The humanoid body with the consumable head not only provides an amusing Inducement for a child to use the handle, holder and an effective advertising display but the body shape itself also facilitates reliable hand holding by a child and adult and a stable mounting on a generally flat surface.

Figure 4:
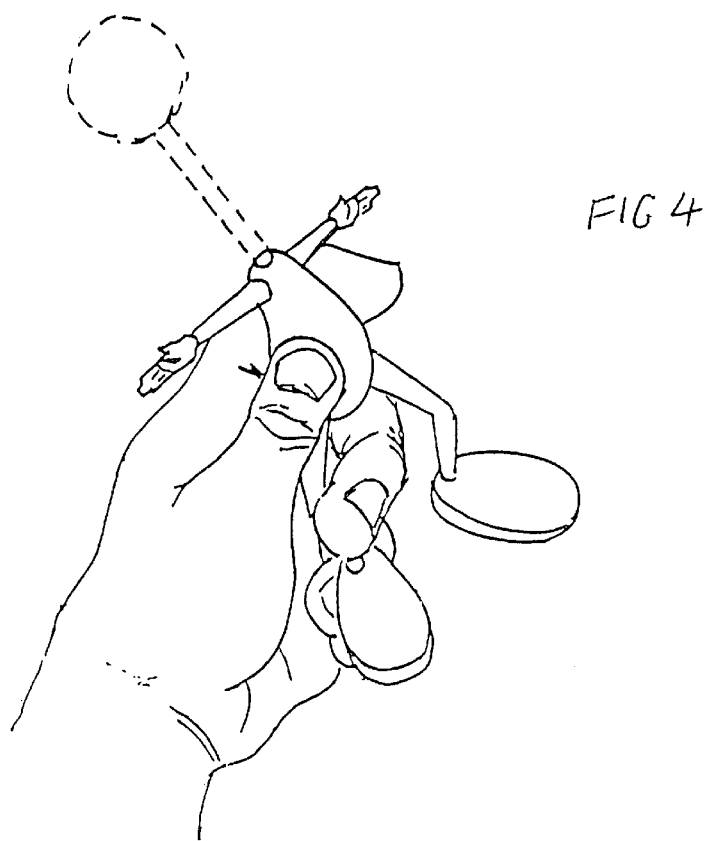
FIG. 4 is a perspective view holding the lollipop and grasped by an adult's hand.

For example, as shown in FIG. 3, the holder will be prevented from slipping out of the often unreliable or relaxed grasp of a young child by the arms and legs outstanding above and below the child's fist, while the individual appendages can also provide many finger engageable portions for the (larger) hand as shown in FIG. 5, aiding reliable retention during consumption. The constriction retains the lollipop in the holder even when inverted or subjected to a normal sucking action. The pear shape of the torso also lowers the center of gravity while the divergence of the legs and flat feet enhance stable mounting on a surface. Substantially the entire body lies within a vertical envelope (indicated by broken lines in FIG. 4 bounded by the perimeter of the feet, enhancing stability.

I claim:

1. A combination lollipop holder and stand comprising a body molded in one-piece forming an animal character and having an elongate torso providing a handle portion, two arm parts outstanding laterally from an upper end of the torso, providing a finger guarding portion and leg parts diverging from opposite sides of a lower end of the body to a flat, foot part, providing a base portion; and, a bore extending from a neck region between the arm parts vertically into the torso and provided with a constriction for gripping a stick of a lollipop when inserted into the bore thereby forming an extended neck and a consumable head of the character, whereby engagement of the arm and leg parts above and below a hand enclosing the torso prevents inadvertent dislodgement of the lollipop holder from the hand and the constriction prevents inadvertent dislodgement of the lollipop from the bore, when inverted and the foot part supports the body in stable position standing on a flat surface with the lollipop extending upwards from a top of the body at a maximum separation from the surface thereby obviating risk of contaminating contact therewith, and wherein substantially the entire body lies within a vertical envelope bounded by a horizontal perimeter of the foot part.

2. A combination lollipop holder and stand according to claim 1 wherein the leg parts comprise a pair of diverging legs supported by respective flat round feet.

3. A combination lollipop holder and stand according to claim 2 wherein the character is humanoid.

4. A combination lollipop holder and stand comprising a unitary, handle-providing body forming an upright, headless animal character and extending downward towards a flat foot, a bore extending vertically into the upper end of the body and provided with a constriction for gripping a stick of a lollipop when inserted into the bore and thereby forming an extended neck and consumable head of the character, whereby the constriction prevents inadvertent dislodgement of the lollipop from the bore, even when inverted and the foot supports the body in a stable position standing on a flat surface with the lollipop extending upwards from a top of the body at a maximum separation from the surface thereby obviating risk of contaminating contact therewith, and wherein substantially the entire body lies within a vertical envelope bounded by a horizontal perimeter of the foot.

5. A combination lollipop holder and stand having a unitary handle providing body formed in a shape of a headless humanoid character and extending downward to a foot region, with a bore extending into the body from a neck position and force-fitted with a stick of a lollipop for retention when inverted, so that the stick resembles a neck and a lollipop candy thereof resembles a consumable head of the character and the foot region supports the body standing in a stable position standing on a flat surface with the lollipop extending upwards from a top of the body at a maximum separation from the surface thereby obviating risk of contaminating contact therewith, and wherein substantially the entire body lies within a vertical envelope bounded by a horizontal perimeter of the foot region.

\* \* \* \* \*